Patented Jan. 9, 1951

2,537,316

UNITED STATES PATENT OFFICE 2,537,316

SEPARATION OF COLUMBIUM AND TANTALUM VALUES

Assur Gjessing Oppegaard, Fredrikstad, and Andreas Johan Ravnestad, Vikene, Onsoy, Norway, assignors to Titan Company, Inc., New York, N. Y., a corporation of Delaware No Drawing. Application September 12, 1947, Serial No. 773,740. In Norway May 19, 1941

10 Claims. (Cl. 23—19)

This invention relates to the separation of columbium and tantalum values from ores and particularly from ores containing in addition other metallic compounds such as those of titanium, tin, iron, and manganese.

The separation of columbium and tantalum values from complex ores has previously been difficult and in addition, the separation of columbium from tantalum values has been even more difficult due to the chemical similarity of these elements.

It is, therefore, the object of this invention to provide a method for simple and economical recovery of tantalum and columbium values from ores containing impurity metal or metals, particularly one or more of the following: titanium, tin, iron, and manganese. It is a further object of the invention to provide a method for recovery of tantalum or columbium or each individually from raw materials containing compounds of these metals with or without other impurity metals. These and other objects of the invention will be apparent from the following description.

In its broadest aspects, this invention contemplates the treatment of an ore or mixture containing columbium and tantalum and impurity metals with an acid decomposition agent for instance sulphuric acid or sodium acid sulphate. The liquid decomposition product, which may be a solution or partly colloidal suspension is then treated with a strong reducing agent such as metallic zinc. The reducing agent is added in such amount and under such conditions that titanium and, if present, iron, manganese, and tin are reduced but no substantial part of the columbium or tantalum values. By subsequent hydrolysis involving dilution preferably with dilute sulphuric acid induced, for instance, by boiling, the tantalum and columbium values are precipitated as hydrates and may be filtered off and recovered. During hydrolysis, any impurity metals present will be in reduced condition and will not hydrolyze but will remain in solution. For instance, tin and iron will be divalent and titanium will be trivalent and in such valence condition cannot be hydrolyzed in the acid solution.

It is advantageous to carry on the reduction until also a small amount of the columbium is reduced (from the 5-valent to the 4-valent state) in order to be sure against reoxidation of the other reduced metals, as columbium will be reoxidized first. The degree of reduction may be regulated by change in color as hereinafter explained in detail.

The combined precipitate of tantalum and columbium values obtained as above may be separated by known methods. It is preferred, however, to separate values of these metals by a variation of the general procedure outlined above in which the combined hydrates are treated with an acid decomposition agent, such as concentrated sulphuric acid or sodium acid sulphate to form a solution or suspension in which all the columbium and substantially all the tantalum is dissolved. The solution may be then treated with a reducing agent e. g. metallic zinc until the columbium is reduced to at least 4 valent state and preferably until a small part of the columbium is reduced to 3 valent state. The tantalum values may then be precipitated as a hydrate by hydrolysis induced for instance by boiling, and the precipitate filtered off from the solution, washed and if desired, calcined. Substantially pure tantalum oxide may thus be separated. The solution containing the reduced columbium and, if present, other metals may then be subject to oxidizing treatment, for instance, by introducing air through the solution, until substantially all the columbium is oxidized to 5 valent state, preferably with a small part of the columbium remaining in 4 valent state to mitigate against reoxidation of any impurity metals which may be present. Columbium is then hydrolyzed from the solution after oxidation by, for instance, boiling to precipitate columbium hydrate which may be filtered off, washed and, if desired, calcined.

If titanium is present in the filtrate, this may be now oxidized to 4 valent state, hydrolyzed and recovered.

As an alternative procedure, when using the method described above for separating tantalum and columbium values, a large part of the tantalum may be separated by precipitation by dilution after treatment of the combined hydrates with acid. Thus, the precipitated hydrates are treated with such an amount of concentrated sulphuric acid or other acid decomposition agents that all the columbium and practically all the tantalum are dissolved, and upon cooling water is added in such amounts that a great part of the tantalum is precipitated, whereas columbium remains in solution. Good results are achieved by dilution to a concentration of about 30% sulphuric acid. The suspension is thereafter treated with strong reduction agents, such as metallic zinc, whereby columbium is reduced, mainly to the 4-valent state. It is advantageous to reduce a small part of the columbium to the 3-valent state in order to be sure against reoxidation of 4-valent columbium to the 5-valent state prior to the subsequent hydrolysis. By hydrolysis the rest of the tantalum is precipitated, whereas columbium remains in solution and may be filtered off. From the filtrate columbium may be precipitated by hydrolysis upon oxidation to the 5-valent state.

To illustrate the method of this invention, the following examples are given:

*Example I*

To 5 kgs. of finally pulverized columbite containing:

|  | Per cent |
|---|---|
| $Cb_2O_5$ | 69 |
| $Ta_2O_5$ | 6 |
| $TiO_2$ | 5 |
| $FeO$ | 16 |
| $MnO$ | 3 | were added 25 kgs. of concentrated sulphuric acid and 10 kgs. of ammonium sulphate and the mixture was heated to boiling. The reaction product was cooled and thereupon stirred into 100 liters water containing 7 kgs. $H_2SO_4$. During the agitation solution or colloidal solution was cooled with cold water.

The colloidal solution obtained hereby was heated to about 50° C. and reduced with zinc granules so far that the formation of 4 valent columbium, which has a blue color, was apparent. The solution was boiled for about one hour, whereby a considerable amount of precipitate was obtained. The charge was cooled, the precipitate separated from the solution by filtration and washed with diluted sulphuric acid. The filtrate which was clear and had a blue color, contained all iron, manganese, titanium and tin which was present in the raw material.

The weight of the precipitate after the calcination was 70.5% of that of the columbite used. It consisted of columbium oxide and tantalum oxide, and had a pure white color.

The filtrate contained a quantity of 4-valent columbium corresponding to 2% of the entire amount of columbium present.

*Example II*

A raw material consisting substantially of titanium oxide, columbium oxide and tantalum oxide was fused with potassium bisulphate, and the smelt treated with diluted sulphuric acid, whereby a colloidal, slightly opalescent solution was formed. This solution was heated under addition of zinc dust. Hereby the titanium and columbium present were reduced to 3-valent respectively 4-valent state, likewise a small part of the columbium was reduced to the 3-valent state. The solution was thereupon boiled for one hour. A considerable amount of precipitate was formed, and this precipitate was separated from the solution by filtration, washed and calcined. It consisted of pure tantalum oxide which had a white color, and the weight of which was 98% of the weight of the tantalum oxide originally present.

Air was introduced into the filtrate which contained all of the columbium and titanium and the introduction of air continued until the 3-valent columbium as well as substantially all of the 4-valent columbium had been oxidized, a small amount of 4-valent columbium remaining in the solution. The solution was boiled for an hour, whereby a considerable quantity of precipitate was formed. The precipitate was separated from the solution by filtration, and thereupon washed. It consisted of columbium oxide with about 1% of tantalum oxide, and had a white color.

The filtrate contained all of the titanium, iron and manganese of the raw material, as well as about 4% of the total amount of columbium originally present.

The acid decomposition agent used in the method of this invention may comprise preferably sulphuric acid or an acid sulphate such as sodium or potassium bisulphate or ammonium sulphate or a mixture or combination of these.

The reducing agent used is preferably metallic zinc although other reducing agents with equivalent effect may be employed. Reduction with metallic zinc is carried out by adding zinc dust to the solution in question in some excess of the required amount. The excess may easily be dissolved by the sulphuric acid so that no zinc is left in the precipitate. Should any zinc be left in the precipitate, it may easily be leached out by acid treatment during the washing of the precipitate.

During reduction of a solution containing titanium, columbium and tantalum, the titanium will first be reduced to 3-valent state and give violet color of the solution. Thereafter columbium is reduced from 5-valent to 4-valent state and gives a strongly brownish color at the start. The color then gradually becomes deeper, acquiring a deep, blue-brown tone, and it is believed that this tone is due to the 3-valent columbium. It is well known that 5-valent columbium sulfate possesses no color, 4-valent columbium possesses a blue color, and 3-valent columbium possesses a very deep blue color. In the presence of the violet or pink colored reduced titanium values and the greenish color of iron, the presence of 4-valent columbium produces the above-described strongly brownish color which gradually deepens upon the presence of more 4-valent columbium and finally acquires a deep blue brown tone described above when 3-valent columbium is present. For analytical and control methods, the percentages of 3-valent and 4-valent columbium may be determined by titration with ferric solution until the brown tone of the 4-valent columbium disappears. However, this method does not determine the actual amount of 3-valent columbium, which has to be estimated on basis of the total amount of columbium in solution. This has then to be determined separately.

Columbium is oxidized from the 3- and 4-valent state to the 5-valent state simply by leading air through the solution. The oxidation proceeds rapidly.

While this invention has been described and illustrated by the examples given, it is not intended to be strictly limited thereto and other variations and modifications may be employed within the scope of the following claims.

We claim:

1. A process for recovery of columbium and tantalum values from ore containing other metal impurities which comprises decomposing said ore with an acid decomposition agent adding a strong reducing agent to the resultant liquid decomposition product in sufficient amount as to reduce to soluble compounds of lower valence the other metal impurities but not more than a small amount of the columbium and tantalum, and precipitating unreduced columbium and tantalum values from the liquid portion of said reduced decomposition product by hydrolysis.

2. A process for recovery of columbium and tantalum values from ore containing in addition, tin, iron, manganese, and titanium, which comprises decomposing said ore with an acid decomposition agent, adding metallic zinc to the resultant liquid decomposition product in sufficient amount as to reduce to soluble compounds of lower valence the other metal impurities but not more than a small amount of the columbium and tantalum, and precipitating unreduced columbium and tantalum values from the liquid portion of said reduced decomposition product by hydrolysis.

3. A process for recovery of columbium and tantalum values from ore containing other metal impurities which comprises decomposing said ore with an acid sulphate dissolving agent, adding a strong reducing agent to the resultant liquid decomposition product in sufficient amount as to reduce to soluble compounds of lower valence the other metal impurities but not more than a small amount of the columbium and tantalum, and precipitating unreduced columbium and tantalum values from the liquid portion of said reduced decomposition product by hydrolysis.

4. A process for recovery of columbium and tantalum values from ore containing other metal impurities which comprises decomposing said ore with sulphuric acid, adding a strong reducing agent to the resultant liquid decomposition product in sufficient amount as to reduce to soluble compounds of lower valence the other metal impurities but not more than a small amount of the columbium and tantalum and precipitating unreduced columbium and tantalum values from the liquid portion of said reduced decomposition product by hydrolysis.

5. A process for recovery of columbium and tantalum values from ore containing other metal impurities which comprises decomposing said ore with a solution of sodium acid sulphate, adding a strong reducing agent to the resultant liquid decomposition product in sufficient amount as to reduce to soluble compounds of lower valence the other metal impurities but not more than a small amount of the columbium and tantalum and precipitating unreduced columbium and tantalum values from the liquid portion of said reduced decomposition product by hydrolysis.

6. A process for recovery of columbium and tantalum values from ore containing other metal impurities which comprises decomposing said ore with an acid decomposition agent, adding a strong reducing agent to the resultant liquid decomposition product in sufficient amount as to reduce to soluble compounds of lower valence the metal impurities, and a small part of the columbium to 4-valent state, and precipitating unreduced columbium and tantalum values from the liquid portion of said reduced decomposition product by hydrolysis.

7. A process for recovery of columbium and tantalum values from ore containing other metal impurities which comprises decomposing said ore with an acid decomposition agent, adding a strong reducing agent to the resultant liquid decomposition product in sufficient amount as to reduce to soluble compounds of lower valence the other metal impurities but not more than a small amount of the columbium and tantalum and precipitating unreduced columbium and tantalum values from the liquid portion of said reduced decomposition product by hydrolysis, filtering off said hydrolyzed columbium and tantalum values, and redissolving the same in an acid sulphate dissolving agent, reducing the columbium in the resultant solution substantially to 4-valent state, precipitating tantalum values from said solution by hydrolysis, reoxidizing the columbium in said solution to 5-valent state and precipitating columbium values by hydrolysis.

8. A process for separation of columbium and tantalum from mixtures of the same which may contain other metal impurities which comprises decomposing said ore with an acid sulphate decomposition agent, adding a strong reducing agent to the resultant liquid decomposition product in sufficient amount to reduce a small part of the columbium to 3-valent state with impurities if present being reduced to soluble compounds of lower valence, precipitating tantalum from the liquid portion of said reduced decomposition product by hydrolysis, and filtering off the same, oxidizing the columbium in the filtrate substantially completely to 5-valent state and precipitating columbium values by hydrolysis therefrom.

9. A process for separation of columbium and tantalum from mixtures of the same which may contain other metal impurities which comprises decomposing said ore with an acid sulphate decomposition agent adding a strong reducing agent to the resultant liquid decomposition product in sufficient amount to reduce a small part of the columbium to 3-valent state, with impurities if present being reduced to soluble compounds of lower valence, precipitating tantalum from the liquid portion of said reduced decomposition product by hydrolysis, and filtering off the same, oxidizing a major part of the columbium in the filtrate to 5-valent state and precipitating columbium values by hydrolysis therefrom.

10. A process for separation of columbium and tantalum from mixtures of the same which may contain other metal impurities which comprises decomposing said ore with an acid sulphate decomposition agent adding metallic zinc to the resultant liquid decomposition product in sufficient amount to reduce a small part of the columbium to 3-valent state with impurities if present being reduced to soluble compounds of lower valence, precipitating tantalum from the liquid portion of said reduced decomposition product by hydrolysis, and filtering off the same, oxidizing the columbium in the filtrate substantially completely to 5-valent state and precipitating columbium values by hydrolysis therefrom.

ASSUR GJESSING OPPEGAARD.
ANDREAS JOHAN RAVNESTAD.

REFERENCES CITED

The following references are of record in the file of this patent:

UNITED STATES PATENTS

| Number | Name | Date |
| --- | --- | --- |
| 2,259,396 | Schlecht | Oct. 14, 1941 |